(12) United States Patent
Mizobuchi et al.

(10) Patent No.: US 9,329,981 B2
(45) Date of Patent: May 3, 2016

(54) TESTING PROGRAM, TESTING METHOD, AND TESTING DEVICE

(71) Applicant: FUJITSU LIMITED, Kawasaki-shi, Kanagawa (JP)

(72) Inventors: Yuji Mizobuchi, Kawasaki (JP); Kuniaki Shimada, Kawasaki (JP); Yuji Wada, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/340,748

(22) Filed: Jul. 25, 2014

(65) Prior Publication Data

US 2015/0033212 A1    Jan. 29, 2015

(30) Foreign Application Priority Data

Jul. 25, 2013 (JP) .................. 2013-155046

(51) Int. Cl.
G06F 9/44 (2006.01)
G06F 11/36 (2006.01)

(52) U.S. Cl.
CPC .................. *G06F 11/3688* (2013.01)

(58) Field of Classification Search
None
See application file for complete search history.

(56) References Cited

U.S. PATENT DOCUMENTS

| | | | |
|---|---|---|---|
| 7,506,312 B1* | 3/2009 | Girolami-Rose et al. | 717/124 |
| 7,747,987 B1* | 6/2010 | Akarte et al. | 717/131 |
| 7,913,230 B2* | 3/2011 | Vikutan | 717/124 |
| 8,347,223 B2* | 1/2013 | Ikegami | 715/780 |
| 8,356,287 B2* | 1/2013 | Tzoref et al. | 717/130 |
| 8,627,287 B2* | 1/2014 | Fanning et al. | 717/124 |
| 8,826,239 B2* | 9/2014 | Sawano | 717/126 |
| 9,170,900 B2* | 10/2015 | Kalayci | |
| 9,195,555 B2* | 11/2015 | Kalayci | |
| 2005/0081106 A1* | 4/2005 | Chang et al. | 714/38 |

(Continued)

FOREIGN PATENT DOCUMENTS

| | | |
|---|---|---|
| JP | 63-93053 | 4/1988 |
| JP | 2-10443 | 1/1990 |

(Continued)

OTHER PUBLICATIONS

Hirayama et al., "A Selective Software Testing Method Based on Priorities Assigned to Functional Modules", 2001 IEEE, retrieved from <http://ieeexplore.ieee.org/stamp/stamp.jsp?tp=&arnumber=990028>, pp. 259-267.*

(Continued)

*Primary Examiner* — Marina Lee
(74) *Attorney, Agent, or Firm* — Staas & Halsey LLP

(57) ABSTRACT

A non-transitory computer-readable recording medium having stored therein a test program that causes a computer to execute a process comprising: starting a test of a test-target program containing a plurality of modules by executing a plurality of individual tests, the plurality of individual tests being associated with the plurality of modules, respectively; generating test-relationships information that includes relationships between the plurality of individual tests based on module-relationships information including relationships of the plurality of modules; and in cases in which results of the plurality of individual tests include one or a plurality of specific results fulfilling a specific condition, specifying one or a plurality of additionally executing tests based on the one or plurality of specific results and the test-relationships information.

19 Claims, 14 Drawing Sheets

(56) References Cited

U.S. PATENT DOCUMENTS

| | | | |
|---|---|---|---|
| 2005/0144529 A1* | 6/2005 | Gotz et al. | 714/38 |
| 2007/0089092 A1* | 4/2007 | Schmidt et al. | 717/126 |
| 2007/0094189 A1* | 4/2007 | Yamamoto et al. | 706/45 |
| 2008/0184206 A1* | 7/2008 | Vikutan | 717/127 |
| 2009/0113399 A1* | 4/2009 | Tzoref et al. | 717/130 |
| 2009/0144698 A1* | 6/2009 | Fanning et al. | 717/120 |
| 2009/0265694 A1* | 10/2009 | Bakowski | 717/131 |
| 2012/0089964 A1* | 4/2012 | Sawano | 717/124 |
| 2014/0325485 A1* | 10/2014 | Sawano | 717/124 |
| 2014/0351797 A1* | 11/2014 | Kalayci | 717/127 |
| 2015/0007140 A1* | 1/2015 | Boshernitsan et al. | 717/124 |
| 2015/0012780 A1* | 1/2015 | Kalayci | 714/32 |
| 2015/0033212 A1* | 1/2015 | Mizobuchi et al. | 717/131 |

FOREIGN PATENT DOCUMENTS

| | | |
|---|---|---|
| JP | 2008-204405 | 9/2008 |
| JP | 2010-134643 | 6/2010 |

OTHER PUBLICATIONS

Patent Abstracts of Japan, Publication No. 63-093053, published Apr. 23, 1988.

Patent Abstracts of Japan, Publication No. 02-010443, published Jan. 16, 1990.

Patent Abstracts of Japan, Publication No. 2008-204405, published Sep. 4, 2008.

Patent Abstracts of Japan, Publication No. 2010-134643, published Jun. 17, 2010.

* cited by examiner

FIG. 5

| FROM | TO | CONTENTS |
|---|---|---|
| a | b | CALL |
| b | c | CALL |
| b | d | CALL |
| c | e | CALL |
| c | STORAGE | REFERENCE |
| d | STORAGE | UPDATE |
| e | STORAGE | REFERENCE |

TEST 80

| | a_1 | a_2 | a_3 | a_4 | a_5 | a_6 | b_1 | b_2 | b_3 | b_4 | b_5 | b_6 | c_1 | c_2 | c_3 | c_4 | d_1 | d_2 | e_1 | e_2 |
|---|---|---|---|---|---|---|---|---|---|---|---|---|---|---|---|---|---|---|---|---|
| a | ○ | ○ | ○ | ○ | ○ | ○ | | | | | | | | | | | | | | |
| b | ○ | ○ | ○ | ○ | ○ | ○ | ○ | ○ | ○ | ○ | ○ | ○ | | | | | | | | |
| c | ○ | ○ | ○ | ○ | | | ○ | ○ | ○ | ○ | | | ○ | ○ | ○ | ○ | | | | |
| d | | | ○ | | ○ | ○ | | | ○ | ○ | ○ | ○ | | | | | ○ | ○ | | |
| e | | | | ○ | | | | | | ○ | | | | | ○ | ○ | | | ○ | ○ |
| STORAGE | | ○ | | ○ | | ○ | | ○ | | ○ | | ○ | | ○ | | ○ | | ○ | | ○ |

TESTING PROGRAM, TESTING METHOD, AND TESTING DEVICE

CROSS-REFERENCE TO RELATED APPLICATION

This application is based upon and claims the benefit of priority of the prior Japanese Patent Application No. 2013-155046, filed on Jul. 25, 2013, the entire contents of which are incorporated herein by reference.

FIELD

The embodiments discussed herein are related to a storage medium having stored therein a testing program, a testing method, and a testing device.

BACKGROUND

Time scales granted for program development have decreased in recent years. However, tests require an increased number of processes in order to confirm program functionality and operation due to increasing functionalities and greater operational complexity of programs. Various technologies have been proposed for efficient execution of program tests in response to these opposing trends.

For example, technology is known in which tests with high bug detection rates are selected, and executed, from out of plural tests for a program subject to test execution (referred to below as a test-target program). In such technology, from the standpoint of focusing tests on parts where there are more highly influential bugs present, priority levels are given to tests for functionalities of the test-target program in order to efficiently select tests out of plural tests. Test priority levels predefine evaluation standpoints and evaluation score weightings to give priority levels to functionalities, and the evaluation standpoints and evaluation score weightings are used to designate test priority levels for each functionality. Executing tests using the designated test priority levels increases bug detection rates.

Technology is also known in which sections that should be tested are pre-extracted based on modified parts of the test-target program, and program tests are executed. In such technology, dependency relationships are pre-extracted for each line of the test-target program (for example, each statement), and tests are executed that correspond to lines having a dependency relationship to modified lines. Moreover, such technology uses a priority level expressed as an index indicating dependency relationship strength in which values increase as the dependency relationship becomes lower. The priority levels are derived in advance using dependency relationships derived from analytical results of test-target program analysis. Test efficiency is thereby increased by using pre-analysis to derive the tests having strong dependency relationships with modified parts of the test-target program, and executing these tests.

Technology is also known in which tests are selected for a test-target program based on predefined importance levels and average execution times of the tests. In such technology, a user manually pre-sets, as test importance levels, values to determine whether or not a test is executed.

RELATED PATENT DOCUMENTS

Japanese Laid-Open Patent Publication No. 2008-204405
Japanese Laid-Open Patent Publication No. 2010-134643

A Selective Software Testing Method Based on Priorities Assigned to Functional Modules, The Institute of Electronics, Masayuki HIRAYAMA, Tetsuya YAMAMOTO, Jiro OKAYASU, Osamu MIZUNO, Tohru KIKUNO, published in Technical Report by Institute of Electronics, Information and Communication Engineers. SS, Software Science 101(98), 1-8, 2001-05-22

SUMMARY

According to an aspect of the embodiments, A non-transitory computer-readable recording medium having stored therein a test program that causes a computer to execute a process comprising: starting a test of a test-target program containing a plurality of modules by executing a plurality of individual tests, the plurality of individual tests being associated with the plurality of modules, respectively; generating test-relationships information that includes relationships between the plurality of individual tests based on module-relationships information including relationships of the plurality of modules; and in cases in which results of the plurality of individual tests include one or a plurality of specific results fulfilling a specific condition, specifying one or a plurality of additionally executing tests based on the one or plurality of specific results and the test-relationships information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of module relationships in source data;
FIG. 7 is a diagram illustrating relationships of tests to dependent-from in the program dependency graph.

DESCRIPTION OF EMBODIMENTS

Figure 1:
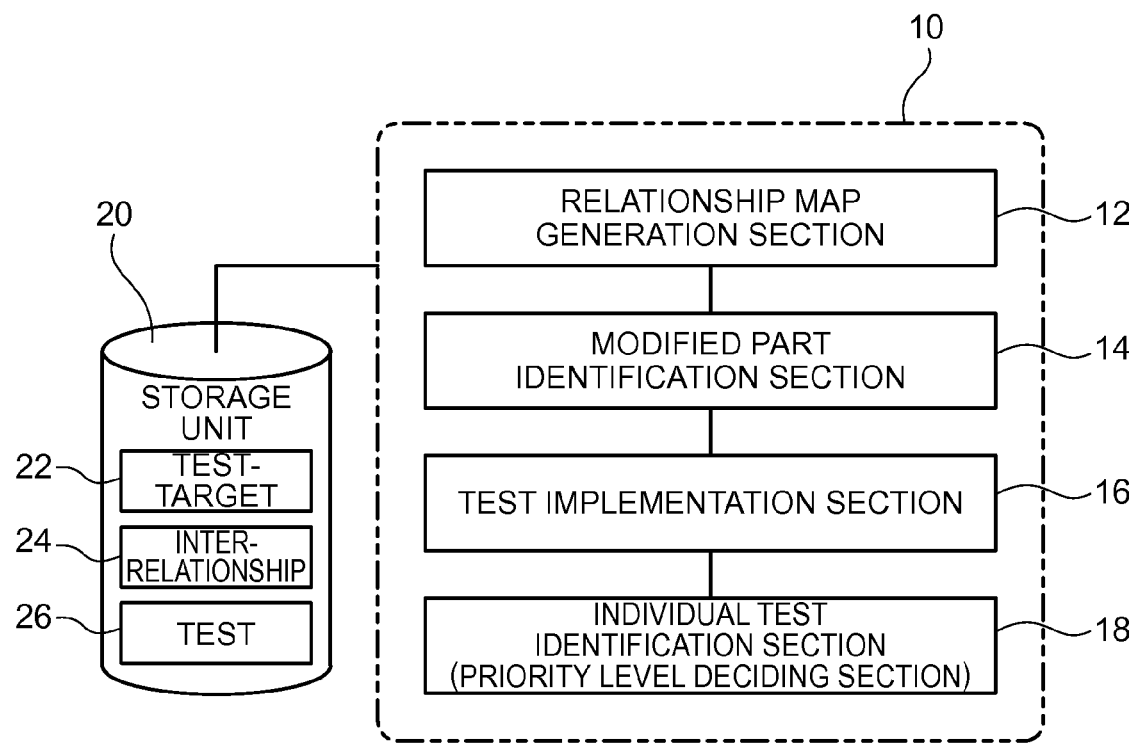
FIG. 1 is a block diagram illustrating an example of a schematic configuration of a testing device.

With increased use of software in recent years, there are demands on program development to execute program tests and make releases within limited times scales. For example, there are cases in which a development method known as DevOps (a portmanteau of development and operations) is introduced in program development. DevOps is a method in which the content of alterations to a program is broken down by release, and the time between releases shortened, with there being less time for executing program testing before release. Namely, the scale of each alteration to the program is small, but the time allocated for testing is also restricted to a short period of time. There is therefore a demand for more efficient testing of test-target programs.

In technology that selects, and executes, tests with high bug detection rates out of plural tests, tests are executed according to priority levels of tests for each function, designated using predefined evaluation standpoints and evaluation score weightings. Since priority levels are designated using predefined evaluation standpoints and evaluation score weightings, tests are specified for extraction based on the designated priority levels, even when the alteration amount to the test-target program is only narrow in scope at each time of alteration. There are therefore cases in which the extracted test bears little relation to the modified parts, and cases in which the execution time for tests on the test-target program is greatly increased. Moreover, selecting tests based on priority levels according to predefined evaluation standpoints, and the like, prevents the next test to be executed from being specified on the basis of results of tests on the altered test-target program.

Moreover, in technology that extracts sections that should be tested, and executes program testing, based on modified parts of the test-target program, dependency relationships are pre-extracted for each line of a test-target program, and tests are executed that correspond to lines having dependency relationships to modified lines. In such technology, since, according to priority level values, all tests are extracted for sections with strong dependency relationships with the parts modified, there are cases in which the extracted tests bear little relation to the parts modified.

Since the user manually pre-sets values for determining whether or not tests should execute in technology in which tests are selected based on their predefined importance and average execution times, there are cases in which frequently used functionalities of test-target programs are not selected.

In an aspect of an exemplary embodiment, identification of individual tests as implementation-targets, and identification of test contents, is based on modified parts in a test-target program.

Detailed explanation is given below with reference to the drawings regarding an exemplary embodiment of technology disclosed herein. In the exemplary embodiment, technology disclosed herein is applied to a case in which regression test execution serves as an example of a case of executing tests on a test-target program containing plural modules.

First Exemplary Embodiment

FIG. 1 illustrates an example of a testing device for a test-target program according to the present exemplary embodiment. A testing device 10 includes a relationship map generation section 12, a modified part identification section 14, a test implementation section 16, and an individual test identification section 18. There are cases in which the individual test identification section 18 functions as a priority level deciding section (more detail is given later). A storage unit 20 is connected to the testing device 10. The storage unit 20 stores data 22 representing a test-target program, data 24 representing inter-test inter-relationships between plural executable tests for the test-target program, and data 26 representing each of the plural executable tests for the test-target program.

Test-target program source code is an example of the data 22 representing the test-target program. The data 22 representing the test-target program may contain data representing modification history of a single test-target program. The data 22 representing the test-target program may also contain data representing, for a single test-target program, the test-target program after modification, and the test-target program before modification. Data representing program source code and test execution time parameters used in execution of each test are examples of the data 26 representing each of plural respective tests.

The test-target program may contain plural modules, and the respective plural modules may each contain one or more specific functions. The tests are processing that confirms the respective functionalities and operations of the plural modules included in the test-target program. Namely, the tests are respectively associated with the plural modules included in the test-target program. Module-relationships information including relationships between plural tests corresponding to the respective modules is an example of the data 24 representing inter-relationships between tests. When a test is implemented on the test-target program, there are cases in which a specific execution result, of an error arising or a bug occurring (fail), is reached while the test is still incomplete. When an specified test reaches a specific execution result, other tests sometimes reach specific execution results according to inter-module relationships. The storage unit 20 stores the data 24 representing inter-relationships between tests that are concurrence relationships to the specified tests.

Note that the testing device 10 is an example of a testing device of technology disclosed herein, and the relationship map generation section 12 is an example of a relationship map generation section of technology disclosed herein. The modified part identification section 14 is an example of a modified part identification section of technology disclosed herein, the test implementation section 16 is an example of a test implementation section of technology disclosed herein, and the individual test identification section 18 is an example of an individual test identification section of technology disclosed herein. The tests of the present exemplary embodiment correspond to individual tests of technology disclosed herein.

The relationship map generation section 12 of the testing device 10 generates data representing dependency relationships, and module-relationships information including relationships, for plural modules contained in the test-target program, and stores these data in the storage unit 20. Namely, the relationship map generation section 12 generates test-relationships information that includes relationships between tests associated with each of the respective plural modules, based on test-relationships information that includes relationships of the plural modules relative to each other (dependency relationships), and stores this data in the storage unit 20. The modified part identification section 14 identifies modified parts in the test-target program based on such data as data representing the modification history of the data 22 representing the test-target program, such as the source code thereof. The test implementation section 16 implements tests associated with the modules, such as of the specific functions corresponding to modified parts in the test-target program as specified by the modified part identification section 14.

The individual test identification section 18 identifies tests associated with modules corresponding to the modified parts of the test-target program. Namely, the altered test-target program has modified parts, and the individual test identification section 18 identifies the next additional test to be executed according to test results of the specified tests on the modules corresponding to modified parts of the test-target program. For example, there are cases in which tests associated with modules corresponding to modified parts of the test-target program have relationships with tests associated with other modules. Namely, when a specific execution result, such as an error, is reached by executing a test, there are sometimes, depending on the inter-module relationships (dependency relationships) of the test-target program, cases in which a test associated with another module concurrently reaches a specific execution result. The individual test identification section 18 then uses the data 24 representing the inter-relationships, and identifies test(s) having concurrency relationships with tests for modules corresponding to modified parts of the test-target program, for example test(s) for higher modules containing higher functions, as the execution-target tests. The test implementation section 16 executes the execution-target tests specified by the individual test identification section 18. The test implementation section 16 consequently executes tests with concurrent relationships, such as the tests for higher modules containing higher functions, in addition to implementing the individual tests of modules corresponding to modified parts of the test-target program. This thereby enables, for example, the execution range of regression tests accompanying modifications, such as program alterations, to be suppressed, and enables a reduction in test processing time to be achieved, for the tests corresponding to the test-target program.

Figure 2:
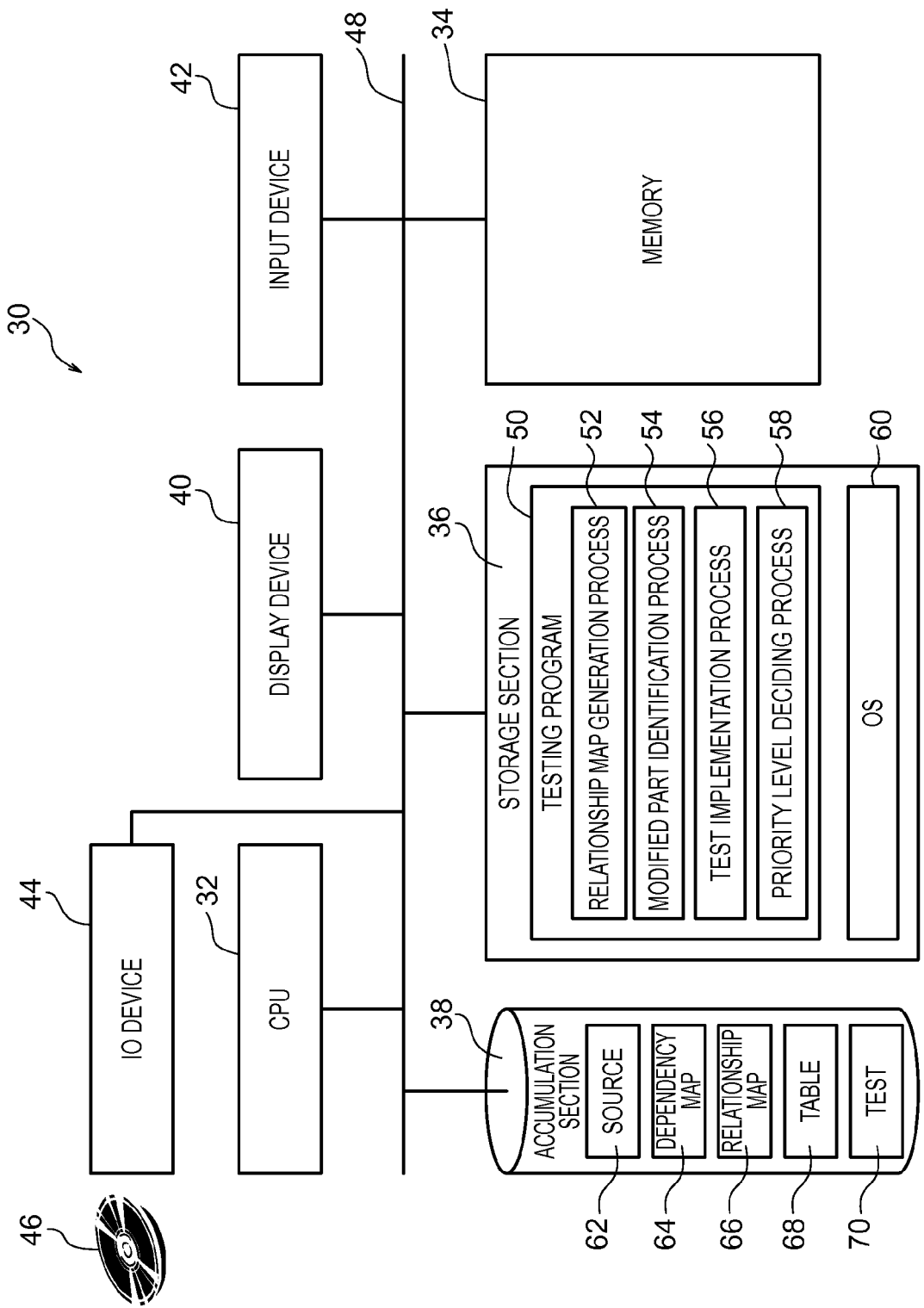
FIG. 2 is a block diagram illustrating an example of an implementation of the testing device by a computer.

FIG. 2 illustrates an example of an implementation of the testing device 10 by a computer 30. The computer 30 includes a CPU 32, memory 34, a non-volatile storage section 36, and an accumulation section 38. The CPU 32, the memory 34, the storage section 36, and the accumulation section 38 are mutually connected through a bus 48. The computer 30 also includes a display device 40, such as a monitor, and an input device 42, such as a keyboard or a mouse, and the display device 40 and the input device 42 are connected to the bus 48. The computer 30 also includes a read/writing (IO device) device 44, for read/writing a recording medium 46 when inserted, also connected to the bus 48. Note that the storage section 36 and the accumulation section 38 may be implemented by a hard disk drive (HDD), flash memory, or the like. The computer 30 may also be provided with an interface, such as for connection to a computer network.

The storage section 36 stores an Operating System (OS) 60, and a testing program 50 that functions as the testing device 10 of the computer 30. The testing program 50 includes a relationship map generation process 52, a modified part identification process 54, a test implementation process 56, and a priority level deciding process 58. The CPU 32 reads the testing program 50 from the storage section 36 and expands the testing program 50 into the memory 34, and the computer 30 operates as the testing device 10 illustrated in FIG. 1 by executing each process of the testing program 50. The computer 30 operates as the relationship map generation section 12 illustrated in FIG. 1 by the CPU 32 executing the relationship map generation process 52, and the computer 30 operates as the modified part identification section 14 illustrated in FIG. 1 by the CPU 32 executing the modified part identification process 54. The computer 30 operates as the test implementation section 16 illustrated in FIG. 1 by the CPU 32 executing the test implementation process 56, and the computer 30 operates as the individual test identification section 18 illustrated in FIG. 1 by the CPU 32 executing the priority level deciding process 58.

The accumulation section 38 accumulates source data 62, dependency map data 64, relationship map data 66, table data 68, and test data 70. The source data 62 represents source code of the test-target program. The dependency map data 64 represents dependency relationships of function-containing modules in the source code of the test-target program. The relationship map data 66 represents inter-relationships between individual tests related to the function-containing modules in the test-target program source code. The table data 68 represents various tables. The test data 70 represents data of each of the plural individual tests, such as respective source code. The accumulation section 38 corresponds to the storage unit 20 illustrated in FIG. 1. The source data 62 corresponds to the data 22 representing the test-target program illustrated in FIG. 1. The dependency map data 64, the relationship map data 66, and the table data 68 correspond to the data 24 representing the inter-relationships illustrated in FIG. 1. The test data 70 corresponds to the data 26 representing the tests illustrated in FIG. 1.

Note that program dependency graphs are an example of a technique for representing dependency relationships of functions in the test-target program source code. The following document is a known example of a technique relating to program dependency graphs.

The program dependence graph in a software development environment by K. Ottenstein and L. Ottenstein, published in Proceedings of the ACM SIGSOFT/SIGPLAN Software Engineering Symposium on Practical Software Development Environments, pp. 177-184. SIGPLAN, 1984.

The testing device 10 may be connectable to a computer network. Namely, the testing device 10 is not limited to being connected to, or not being connected to, a computer network. The technology disclosed herein may be implemented by the computer 30 alone, as in the example of the testing device 10, or the testing device 10 may be implemented by plural computers.

Explanation next follows regarding the operation of the present exemplary embodiment.

When executing tests (for example regression tests) on a test-target program, identification of modified contents of the test-target program, and identification of parts influenced by the modified contents, contribute to the efficiency of test execution. Namely, it is preferable to narrow the plural tests associated with the modules of the test-target program, down to tests based on the modified contents. Note that examples of modified contents of the test-target program are not limited to altered parts representing simple source code differences, such as altered constants; modified parts may influence other function-containing modules due to the relationships between function-containing modules in the test-target program modules.

For example, tests for other modules influenced by the modified parts are not always considered when narrowing down plural tests to tests corresponding to altered parts of the source code. When execution of an specified test produces an error, there are cases in which tests on other modules that have an inter-module inter-relationship thereto also produce an error, with this considered to be a concurrency relationship of inter-relationship between the tests that produced errors. It is therefore preferable to execute additional tests for other modules having concurrency relationships when executing tests on specified modules results in an error being produced. Furthermore, tests having concurrency relationships with the specified tests are considered to have a higher likelihood of producing errors compared to tests without concurrency relationships.

In the present exemplary embodiment, the tests that produced errors are then related to each other with a concurrency relationship as inter-related tests, and tests that should be executed are specified using inter-test relationship data. Note that in the present exemplary embodiment, the relationship map data 66 representing a test relationship map is used to acquire data inter-relating tests by concurrency relationships.

Figure 3:
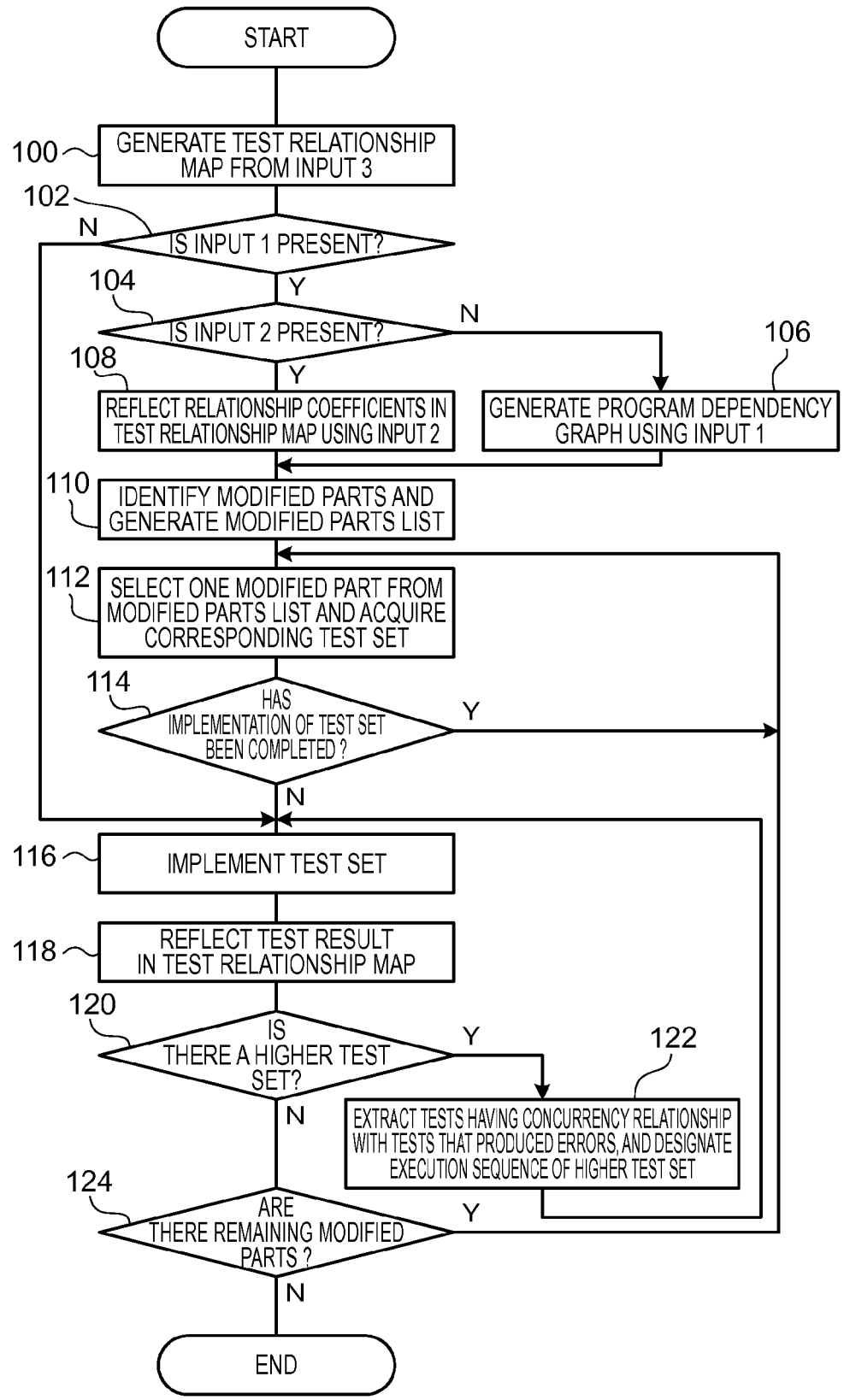
FIG. 3 is a flow chart illustrating an example of a test process flow in the testing device.

FIG. 3 illustrates an example of a testing flow for the test-target program in the testing device 10. The testing flow illustrated in FIG. 3 is processed by the testing program 50, executed as an example of a testing program of technology disclosed herein. Note that in the following explanation, data depicted as input 1 is data representing the source code before modification of the test-target program. Explanation is given in which data depicted as input 2 is data representing the test relationship map corresponding to the source code before modification of the test-target program. Explanation is given in which data depicted as input 3 is data representing the source code after modification of the test-target program, and data representing tests corresponding to the source code after modification of the test-target program.

First, the CPU 32 initiates execution of each process included in the testing program 50. Specifically, at step 100, the CPU 32 fetches the test-target program by acquiring the source data 62 from the accumulation section 38. At step 100, the CPU 32 executes test relationship map generation processing using the data depicted by input 3.

Explanation next follows regarding the execution of the test relationship map generation process by the CPU 32 at step 100. In the test relationship map generation process, the source data 62 of the test-target program is analyzed, and a program dependency graph is generated for the test-target program. In the test relationship map generation process, a test relationship map is also generated for the generated program dependency graph of the test-target program, relating respective tests based on test execution results.

Figure 4:
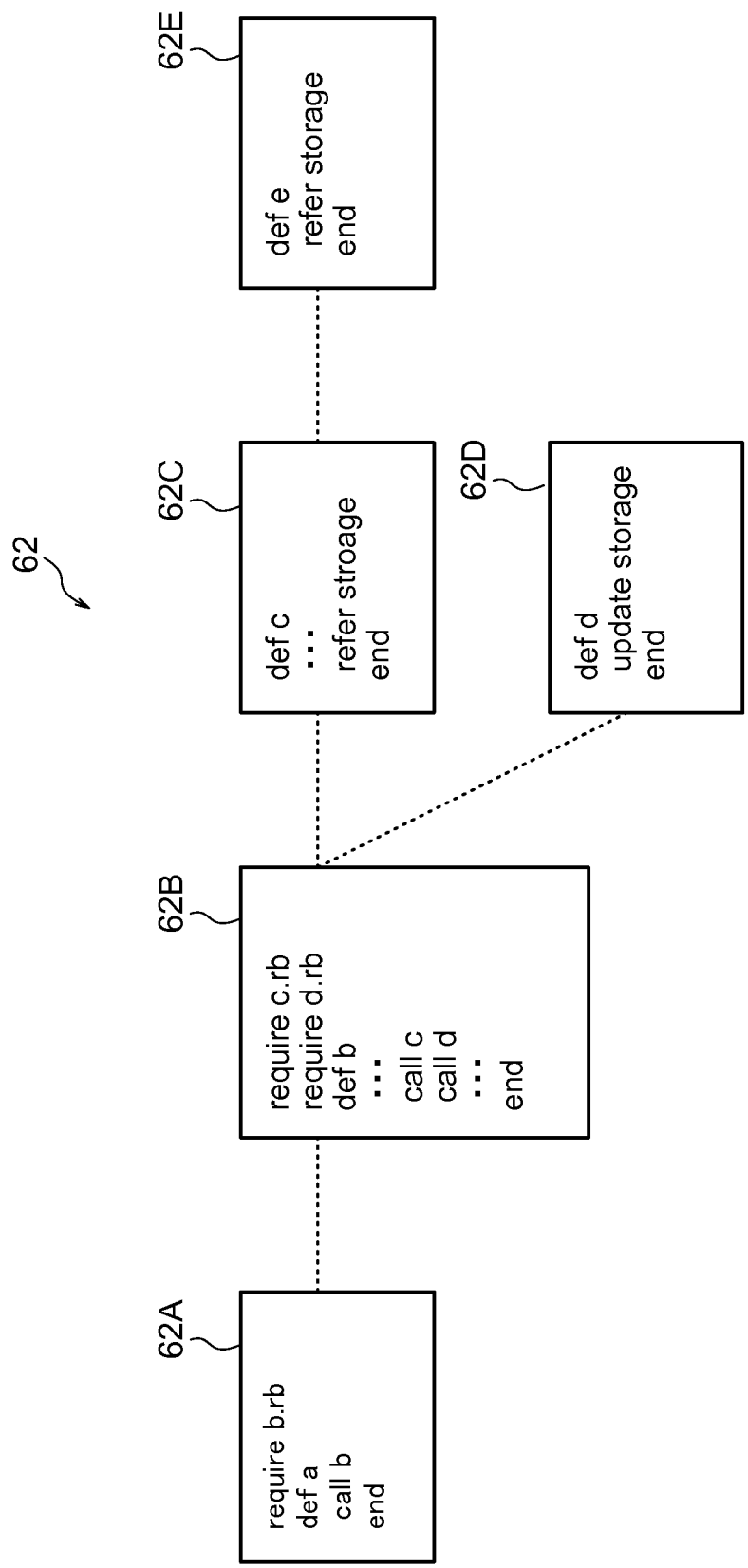
FIG. 4 is a diagram illustrating an example of source code of a test-target program.
Figure 6:
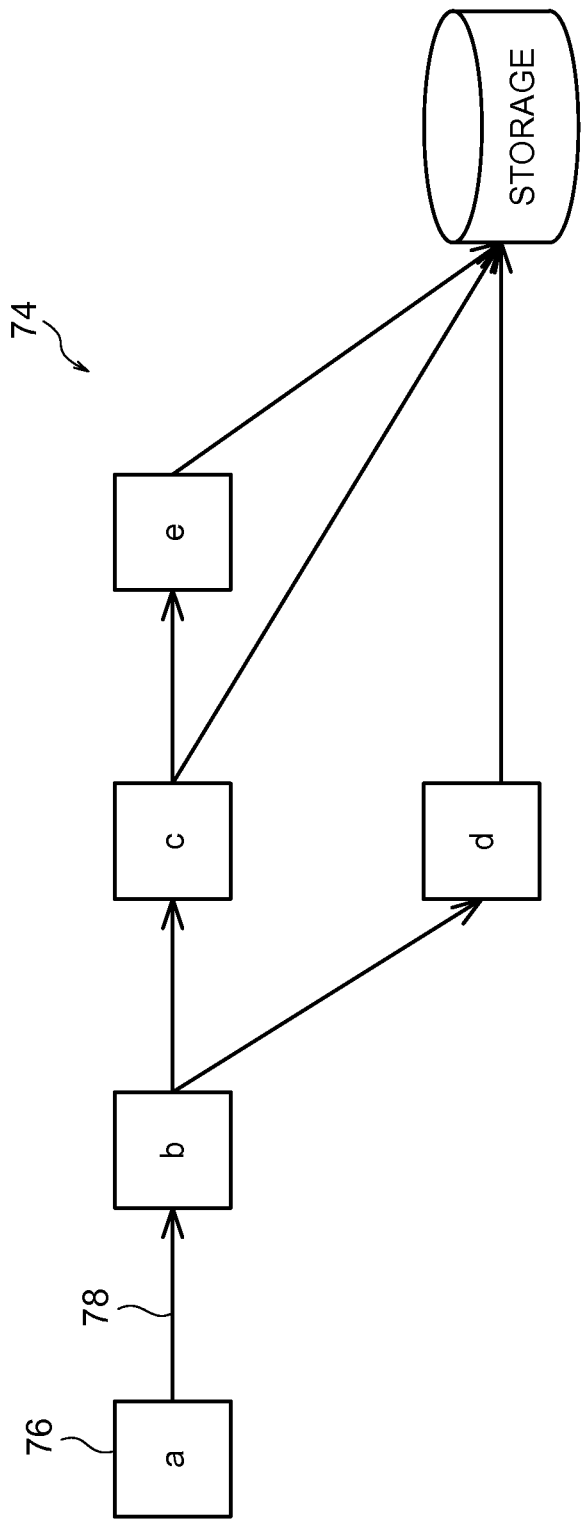
FIG. 6 is a diagram illustrating an example of a program dependency graph of the test-target program.

FIG. 4 illustrates an example of source data 62 of the test-target program, and FIG. 5 illustrates an example of data representing module relationships in the source data 62. FIG. 6 illustrates an example of a program dependency graph 74 for the test-target program. Note that explanation follows regarding an example in which functions correspond to modules. The source data 62 of the test-target program is categorized into function source code 62A, 62B, 62C, 62D, 62E, and the categorized source code 62A to 62E are each related by execution content, such as commands. In FIG. 4, a function a corresponds to the source code 62A, a function b corresponds to the source code 62B, a function c corresponds to the source code 62C, a function d corresponds to the source code 62D, and a function e corresponds to the source code 62E. Each of the source codes 62A to 62E by functional unit are considered initiators with a dependency relationship from the source code of the functional unit itself to at least one other source code and/or device. Control dependency relationships and data dependency relationships are examples of dependency relationships. Storage that stores data is an example of a device.

Therefore, as illustrated in FIG. 5, data representing the dependent-from of a dependency relationship, the dependency-to of the dependency relationship, and contents of the dependency relationship are each obtainable by analysis of the source data 62. FIG. 5 illustrates a table 72 of data representing dependent-from, dependency-to, and contents of dependency relationships, for each of the functions a to e. Data illustrated in the table 72 is corresponded with the test-target program source data 62, and stored in the accumulation section 38 (FIG. 2) as the dependency map data 64 representing the program dependency graph 74. Data representing the table 72 may be included in the table data 68 and stored in the accumulation section 38 (FIG. 2). FIG. 6 illustrates the program dependency graph 74 of the test-target program, generated using the table 72 illustrated in FIG. 5, with functions a to e expressed by nodes 76. Moreover, the program dependency graph 74 of the test-target program illustrated in FIG. 6 illustrates a case in which the nodes and the devices are connected by directional lines 78. Note that the directional lines 78 each express a relationship of influenced-by when the contents of the function at the nodes 76 is modified, as a connection relationship between associated functions, or an associated function and device.

Explanation is next given regarding a process that relates tests to each of the functions a to e that configure the nodes 76 of the program dependency graph 74 of the test-target program. The test-target program is predefined as an application-target for one or more of the tests included in the test data 70A. Moreover, the one or more tests are not tests applied to every function of the application-target test-target program. Thus, in the present exemplary embodiment, each test is related to the respective functions a to e by executing the test on the test-target program, and detecting the function(s) that are contained in the test-target program that is the target.

First, the CPU 32 executes each test for testing the test-target program, and detects functions passed in the test-target program. Relationships are established between functions passed by executing the respective test and the respective executed test, and the highest level function in the program dependency graph 74 of the passed functions is considered the initiator function. Initiator functions are accordingly associated with each of the executed tests.

Figure 8:
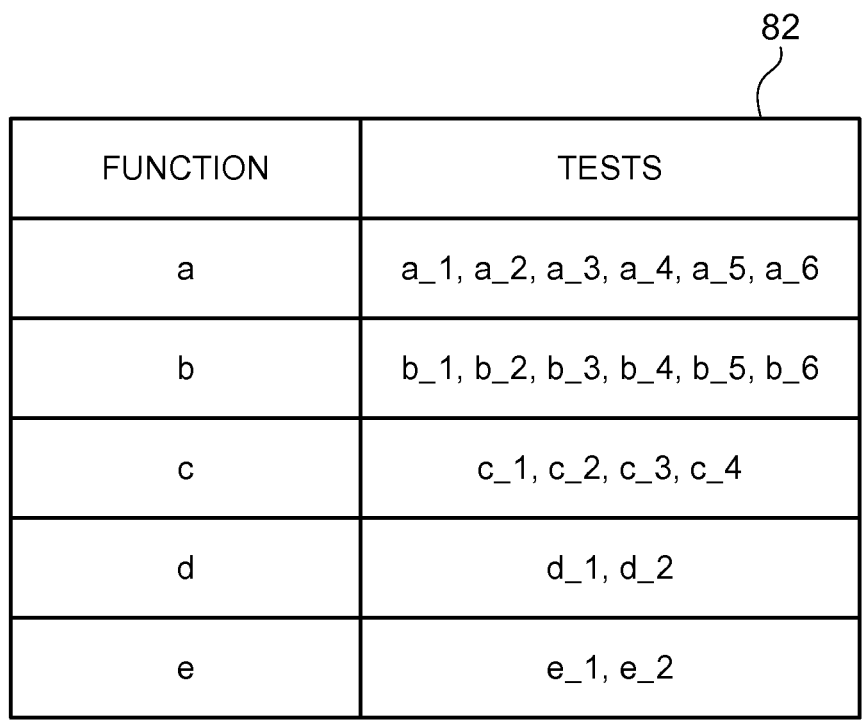
FIG. 8 is a diagram illustrating a table of tests associated with functions.

FIG. 7 illustrates as a function pass table 80 the relationships between tests and dependent-from (functions and devices contained in the test-target program) in the program dependency graph 74. In FIG. 7, circle symbols indicate functions passed in execution of respective tests. Moreover, the example in FIG. 7 lists functions a to e, and storage, in sequence from top to bottom. As illustrated in FIG. 7, the highest level function corresponding to tests a_1 to a_6 is the function a, and the highest level function corresponding to tests b_1 to b_6 is the function b. Similarly, the highest level function corresponding to tests c_1 to c_4 is the function c, the highest level function corresponding to tests d_1 and d_2 is the function d, and the highest level function corresponding to tests e_1 and e_2 is the function e. FIG. 8 illustrates a function test table 82 representing tests associated with functions according to results of implementing the tests on the test-target program. Data representing the function test table 82 illustrated in FIG. 8 is included in the table data 68 and stored in the accumulation section 38 (FIG. 2).

Figure 9:
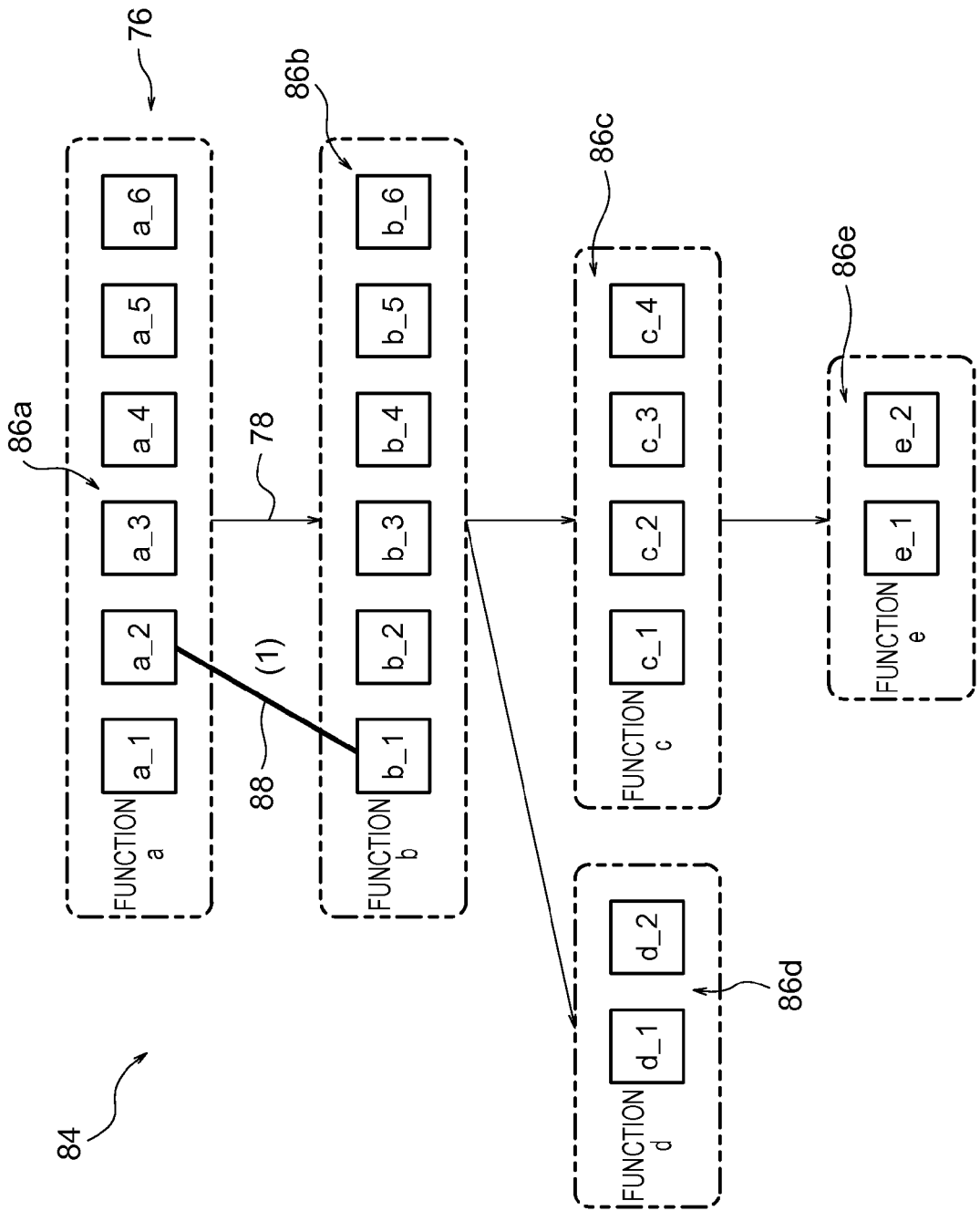
FIG. 9 is a diagram illustrating an example of a test relationship map.

Next, a test relationship map 84 is generated from the program dependency graph 74 (FIG. 6) and the function test table 82 (FIG. 8). The generated test relationship map 84 associates the nodes 76 in the program dependency graph 74 of the test-target program with a test set 86 containing one or more tests corresponding to each function. FIG. 9 illustrates an example of the test relationship map 84. Note that in the explanation below, the one or more tests corresponding to the functions are referred to as test set 86. When the test set 86 is partitioned by function, labels are appended to indicate the functions. In the test relationship map 84 illustrated in FIG. 9, tests a_1 to a_6 associated with the function a are denoted by test set 86*a*, and tests b_1 to b_6 associated with the function b are denoted by test set 86*b*. Similarly, tests c_1 to c_4 are denoted by test set 86*c*, tests d_1 and d_2 are denoted by test set 86*d*, and tests e_1 and e_2 are denoted by test set 86*e*.

The test relationship map 84 may also represent concurrency relationships. Concurrency relationships are relationships between plural tests that produce errors when a test is executed on the test-target program. Namely, concurrency relationships are relationships between tests on the current node and tests on other nodes, for plural tests that produced errors in the results, when the tests contained in the test set 86 of the test-target program have been implemented in sequence on the nodes. In the present exemplary embodiment, an inter-relationship between a test on an specified node that produced an error and a test on a higher node having a dependency relationship with the specified node is described as a concurrency relationship. Note that the concurrency relationship may be represented by a degree of concurrency using a concurrency relationship coefficient K. Cumulative frequencies and probabilities of a concurrency relationship occurring are examples of the concurrency relationship coefficient K.

Figure 10:
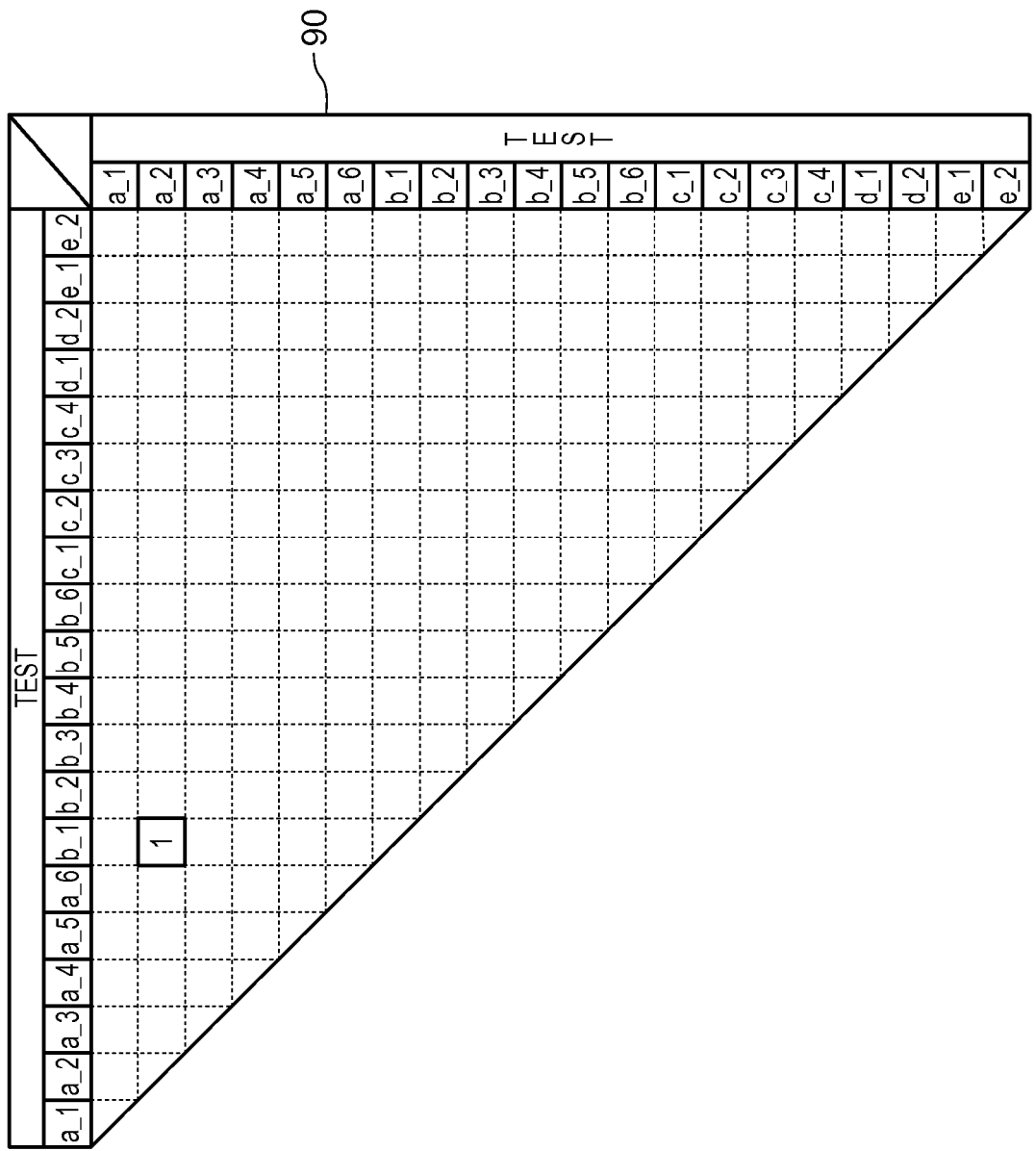
FIG. 10 is a diagram illustrating an example of a concurrency table representing concurrency relationships.

The test relationship map 84 illustrated in FIG. 9 illustrates an example to explain a case in which a concurrency relationship occurs between test a_2 and test b_1, connected by a concurrency line 88. Moreover, the concurrency relationship coefficient K is denoted by the "(1)" near the concurrency line 88 in the test relationship map 84 illustrated in FIG. 9. FIG. 10 illustrates an example of a concurrency table 90 representing concurrency relationships occurring in results of implementing tests on the test-target program. FIG. 10 illustrates a concurrency relationship coefficient K stored in the cell corresponding to the concurrent tests, test a_2 and test b_1. Data representing the concurrency table 90 illustrated in FIG. 10 is included in the table data 68 and stored in the accumulation section 38 (FIG. 2). Note that the concurrency relationships in the test relationship map 84, namely the concurrency lines 88 and the concurrency relationship coefficients K, are updated each time the tests are implemented.

Next, at step 102, the CPU 32 determines whether or not data representing the input 1 is present. Namely, the CPU 32 determines whether or not the accumulation section 38 has accumulated in the source data 62, the source data 62 representing the source code of the test-target program before modification. The CPU 32 transitions processing to step 116 when a negative determination is made at step 102, and transitions processing to step 104 when a positive determination is made at step 102. At step 104, the CPU 32 determines whether or not data representing the input 2 is present. Namely, the CPU 32 determines whether or not the accumulation section 38 has, in the relationship map data 66, accumulated the relationship map data 66 representing the test relationship map corresponding to the source code of the test-target program before modification.

When a negative determination is made at step 104, at step 106, the CPU 32 generates the program dependency graph 74 using data representing the input 1, namely the source code of the test-target program before modification, and transitions processing to step 110. However, when a positive determination is made at step 104, the CPU 32 uses, at step 108, the test relationship map corresponding to the source code of the test-target program before modification expressed by the input 2 to reflect the relationship coefficient (the concurrency relationship coefficient K, explained in detail later) in the test relationship map 84 generated at step 100, and transitions processing to step 110.

Figure 11:
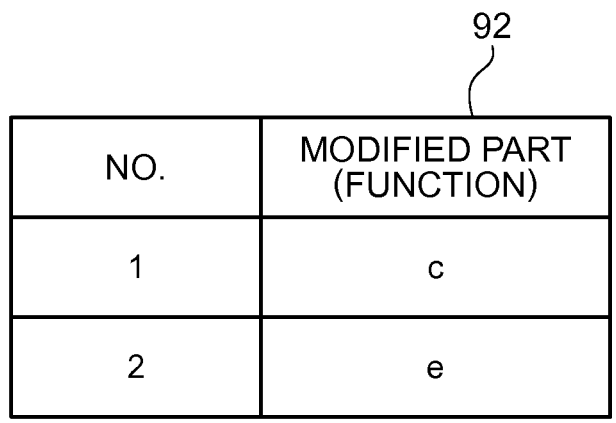
FIG. 11 is a table illustrating an example of a modified parts list.

Next, at step 110, after the CPU has specified modified parts of the test-target program, the CPU 32 then generates a modified parts list 92 (FIG. 11).

Processing that identifies the modified parts identifies functions, which are examples of the modules that are the nodes 76 in the program dependency graph 74, rather than simply the altered parts of the test-target program. Namely, the CPU 32 extracts altered parts from each of the source data 62 of the test-target program before and after modification, and identifies functions, these being the nodes 76 in the program dependency graph 74, corresponding to the extracted altered parts. The CPU 32 generates data representing specified functions of modified parts, as the modified parts list 92. Data representing the generated modified parts list 92 is included in the table data 68 and stored in the accumulation section 38 (FIG. 2). Note that the modified parts list 92 may be temporarily stored in the memory 34.

Parts influenced by the specified modified parts are also specified in the processing that identifies modified parts. Namely, the CPU 32 identifies parts influenced by alterations to functions that are the specified modified parts. Specifically, dependent-from functions of the directional lines 78 in the program dependency graph 74 are recursively extracted from the function nodes 76 that are the specified modified parts. For example, the dependent-from functions of the directional lines 78 in the program dependency graph 74, namely the function b and the function a, are sequentially extracted when the function c is altered. For each modified part, the CPU 32 generates data representing functions in the specified modified parts, and the extracted functions, as an influenced parts list 94. Data representing the generated influenced parts list 94 is included in the table data 68 and stored in the accumulation section 38 (FIG. 2). Note that the influenced parts list 94 may be temporarily stored in the memory 34.

Figure 12:
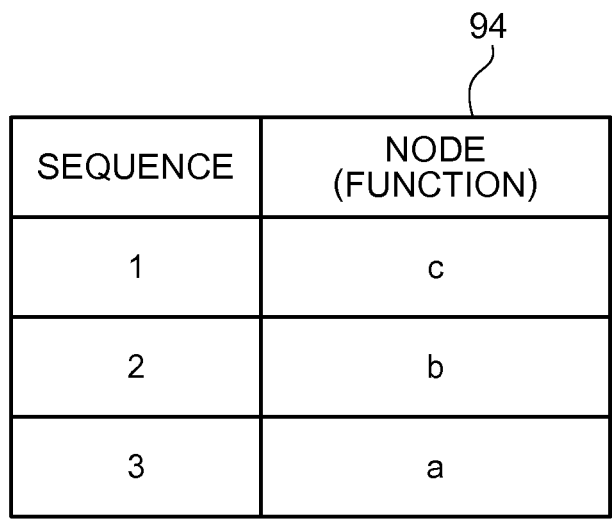
FIG. 12 is a table illustrating an example of an influenced parts list.

FIG. 11 illustrates an example of the modified parts list 92, and FIG. 12 illustrates an example of the influenced parts list 94. The modified parts list 92 in FIG. 11 illustrates a case in which the function c and the function e are the functions in the specified modified parts. The influenced parts list 94 in FIG. 12 illustrates a case in which the function c is the function in the specified modified part, and the function b and the function a are extracted as functions influenced by modification to the function c.

Next, at step 112, the CPU 32 selects one modified part from the modified parts list 92 generated at step 110. Note that at step 110, the CPU 32 selects according to the modified parts list 92 sequence. At step 112, the CPU 32 also acquires the test set 86 associated with functions that are nodes of selected modified parts. Next, at step 114, the CPU 32 determines whether or not implementation of the test set 86 selected at step 112 has already been completed. The CPU 32 makes a positive determination at step 114 when implementation of the test set 86 selected at step 112 has already completed, and processing returns to step 112. Note that the CPU 32 makes a positive determination at step 114 and is able to end the current processing routine in cases in which when the test set 86 selected at step 112 is the final modified part in the modified parts list 92.

Conversely, the CPU 32 makes a negative determination at step 114 when the test set 86 selected at step 112 is a test set 86 that has not yet been implemented, and transitions processing to step 116. At step 116, the CPU 32 executes the test set 86 acquired at step 112, and at the next step 118, reflects the test set 86 execution results in the test relationship map 84.

Next, at step 120, the CPU 32 determines whether or not the test set 86 is associated with any functions higher than the functions implemented in the test set 86. Namely, the CPU 32 determines whether or not there are higher hierarchy nodes than the nodes in the program dependency graph 74 corresponding to functions implemented by the test set 86, namely any functions having dependency relationships thereto. Specifically, the CPU 32 references the influenced parts list 94 corresponding to the modified parts selected at step 112, and determines whether or not there are nodes (functions) higher than the nodes currently being processed. The CPU 32 makes a negative determination at step 120 when the test set 86 implemented at step 116 is at the highest level, and the CPU 32 determines at step 124 whether or not there are modified parts remaining unimplemented by the test set 86 in the modified parts list 92. At step 124, the CPU 32 makes a negative determination when the test set 86 has been implemented for all modified parts registered in the modified parts list 92, and the current processing routine is terminated. At step 124, the CPU 32 makes a positive determination when there are modified parts present in the modified parts list 92 for which the test set 86 has not yet been implemented, returns processing to step 112, and executes processing on the remaining modified parts.

The CPU 32 makes a positive determination at step 120 when there are higher functions of the test set 86 than that implemented at step 116, and at step 122 extracts tests having concurrency relationships with tests that produced errors for additional execution. At step 122, the CPU 32 designates an execution sequence for the extracted tests, namely for higher tests contained in the test set 86, then returns processing execution to step 116. Note that the CPU 32 may implement all higher tests contained in the test set 86 in cases in which no error occurred when implementing the test set 86 at step 116. Moreover, the CPU 32 may identify tests using an implementation sequence of tests having concurrency relationships with tests corresponding to modified parts that previously produced errors, as reflected by the test relationship map 84.

At step 122, an execution sequence is designated based on test set 86 priority levels. In more detail, first, the test priority determination equation represented by the following equation gives priority levels TP of tests, contained in a higher function test set 86, having concurrency relationships with tests that produced errors. The test priority level determination equation gives the priority levels TP (TestPriority) for each test set 86 by summation of concurrency relationship weightings (relation_value) of lower test sets 86. Note that the concurrency relationship weighting (relation_value) is the concurrency relationship coefficient K. Moreover, tests are denoted by (Test), and lower test sets 86 by (LowerTestCase). Note that a concurrency relationship weighting (concurrency relationship coefficient K) of 0 is given to tests in lower test sets 86 having no concurrency relationships. Next, a test implementation sequence is designated in order of greatest priority level TP, and tests are designated according to the designated sequence as a test execution sequence of the higher test set 86.

$$\text{TestPriority} = \Sigma_{test_j \in LowerTestCase} \text{relation\_value}(test, test_j)$$

Note that there may be plural functions higher than the test sets 86 implemented at step 116. In such cases, execution sequence may, for example, be designated in order of highest priority level, based on summation of respective priority levels TP of tests contained in the test sets 86 corresponding to each of the plural functions.

Specifically, in the case of the modified parts list 92 illustrated in FIG. 11, first the modified parts list 92 is referenced, the function c is selected as a modified part, and the test set 86c, related to the function c, is implemented. When the tests contained in the test set 86c, related to the function c, produce no errors, the test set 86b for the function b of higher hierarchy is implemented, and subsequently the test set 86a for the function a is implemented. Conversely, when an error is produced by test set 86c related to the function c, tests with concurrency relationships are extracted from higher hierarchy test set 86b, and the tests are implemented by sequence of the test priority levels TP, namely by concurrency relationship weighting summations.

Figure 13:
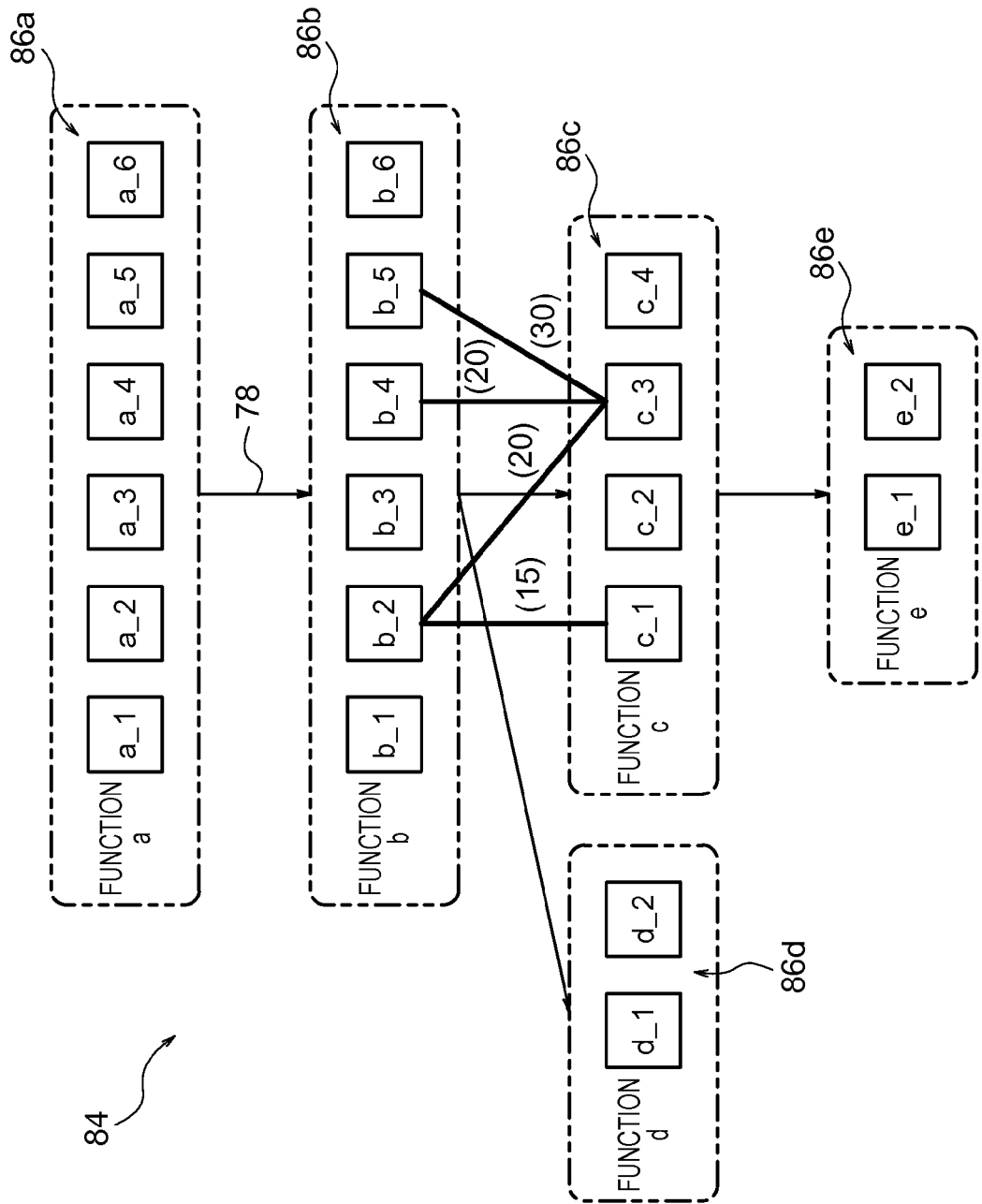
FIG. 13 is an explanatory diagram for execution sequence designation based on priority levels.
Figure 14:
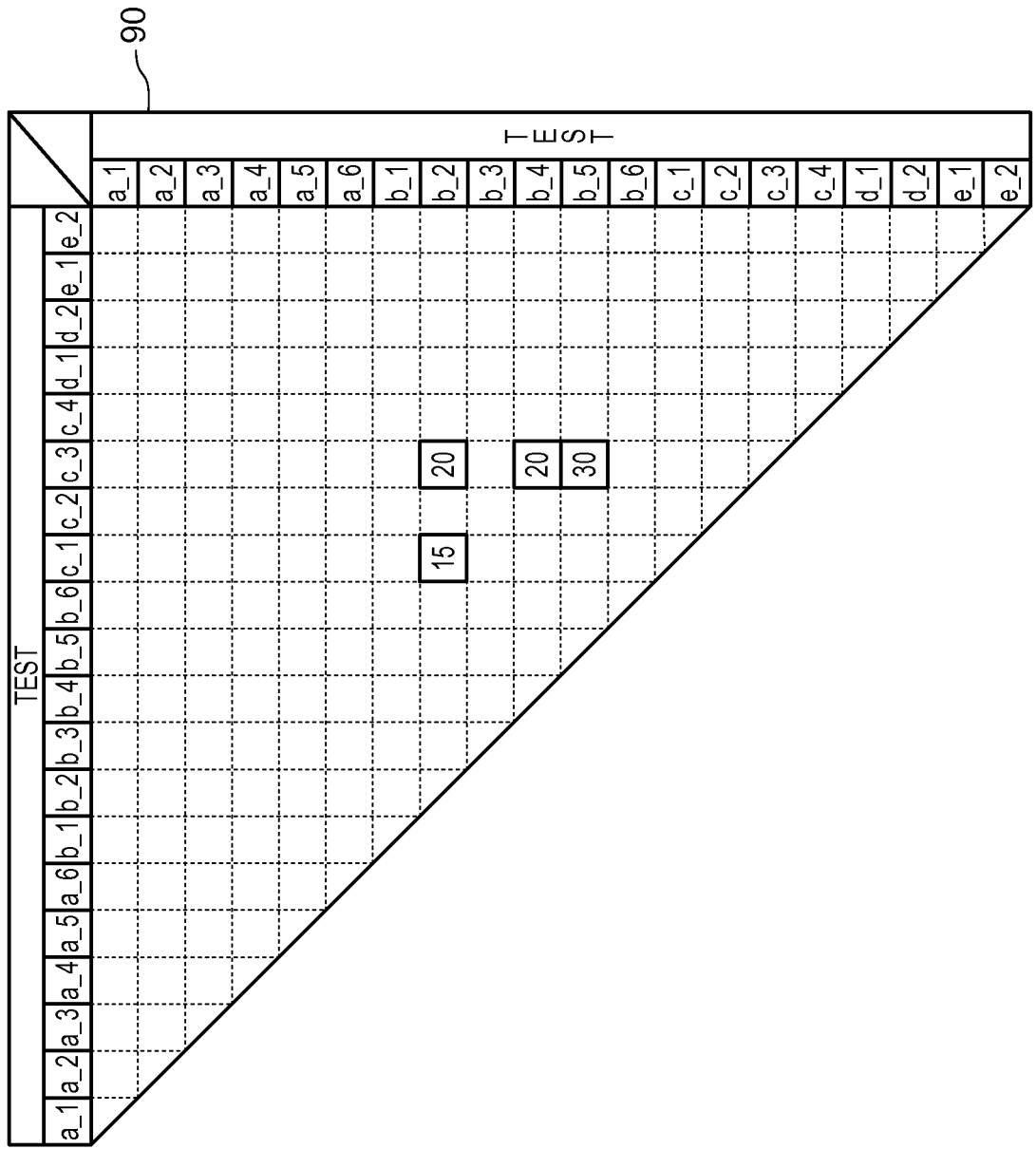
FIG. 14 is a diagram illustrating an example of a concurrency table representing concurrency relationships.

FIG. 13 illustrates an example of the test relationship map 84 to explain designation of execution sequence based on the test set 86 priority levels. The example in FIG. 13 illustrates a case in which errors are produced in test c_1 and test c_3, resulting from implementing the test set 86c for the function c after the function c has been altered. FIG. 14 illustrates an example of the concurrency table 90 representing concurrency relationships. FIG. 14 illustrates "15" stored as the concurrency relationship coefficient K in the cell corresponding to the concurrency related tests, test c_1 and test b_2. Similarly, for the concurrency related tests, "20" is stored in the cell corresponding to test c_3 and test b_2, "20" is stored in the cell corresponding to test c_3 and test b_4, and "30" is stored in the cell corresponding to the test c_3 and the test b_5.

In the test set 86b for the function b, which is higher than test set 86c for the function c, there are concurrency relationships thereto for the test b_2, the test b_4, and the test b_5. The test b_1, the test b_3, and the test b_6 have no concurrency relationships. Moreover, as the priority levels TP, the summation of the concurrency relationship weightings are: the test b_2=35, the test b_4=20, and the test b_5=30. The test b_2, the test b_4, and the test b_5 are therefore designated implementation-target tests for the test set 86b, the order is designated as test b_2, test b_5, test b_4, and the tests are implemented priority-wise in the designated order.

Note that concurrency relationship coefficients K between tests are updated when the test sets contain tests that produced concurrent errors due to test implementation. Given the relationships illustrated in FIG. 13 and FIG. 14, for example, the concurrency relationship coefficient K for the test c_3 and the test b_4 is updated from "20" to "21" when the test c_3 and the test b_4 concurrently produce errors.

Note that the relationship map generation process 52 contains processing of step 100 of the testing program 50 processing explained above. The modified part identification process 54 contains processing of step 110. The test implementation process 56 contains processing of steps 112 and 116. The relationship map generation process 52 contains processing of step 118. Moreover, the priority level deciding process 58 contains processing of step 122.

As explained above, in the present exemplary embodiment tests corresponded to functions that are related by a concurrency relationship between functions corresponding to the modified parts of the test-target program and other functions with dependency relationships thereto, are implemented priority-wise. Namely, when errors arise in tests corresponding to modified parts of the test-target program, tests are additionally specified and executed for tests having a concurrency relationship, as the relationship between tests, defined from the inter-module relationships of the test-target program. It is thereby possible to identify implementation-target tests for tests corresponding to functions contained in the program using inter-relationships between accumulated tests, and to identify test contents corresponding to the test-target program. This thereby enables, for example, the execution range of regression tests, performed to accompany modifications such as program alterations, to be suppressed, and enables a reduction in test processing time.

The present exemplary embodiment enables test execution results to be accumulated by storing test-relationships information that includes relationships between plural tests in the accumulation section 38.

Moreover, the present exemplary embodiment enables categorizing of program source code into function units, and corresponding of the function units to tests, by corresponding tests to modules containing specific functions.

Moreover, when specified tests are executed in the present exemplary embodiment, dependency relationships that are inter-relationships between tests, are accumulated in cases in which errors arise as specific execution results. Rapid response to errors produced by functions is accordingly enabled when testing the test-target program.

Moreover, in the present exemplary embodiment, module-relationships information including relationships between functions relevant to modified parts of the test-target program and other functions having dependency relationships thereto, serves as data representing concurrency relationships in which the concurrency relationship coefficient K indicates the degree of inter-relationship. The concurrency relationship coefficient K is progressively updated in cases in which an error arises when specified tests are executed. It is accordingly possible to accumulate a history of parts highly likely to generate errors for influenced parts dependent on modified parts of the test-target program, enabling execution of tests predicted to be influenced by modified parts in the test-target program.

Moreover, test sets containing plural tests are associated with specified functions in the present exemplary embodiment. Data representing concurrency relationships, that are inter-relationships between tests contained in test sets corresponding to the functions, are used as dependency relationships of functions in a test-target program. Therefore, concurrency relationships between tests contained in test sets enable execution of tests in which it is predicted that an error is highly likely to arise, even when plural tests are associated with an specified function.

Moreover, in the present exemplary embodiment, an execution sequence of tests contained in test sets corresponded to a function is designated using data representing concurrency relationships in which the concurrency relationship coefficient K indicates the degree of inter-relationship. This thereby enables ordering and execution of tests in which it is predicted that an error is highly likely to arise.

Moreover, in the present exemplary embodiment, for modified parts of the test-target program, not simply modifications to the source code, but also modified parts of initiators such as functions having dependencies are extracted. This thereby enables execution of tests corresponding to functions with dependency relationships, and enables execution of tests with consideration of dependency relationships of functions in the test-target program.

Moreover, in the present exemplary embodiment, dependency relationships representing an execution sequence of the test-target program are derived, a test execution sequence is set based on the dependency relationships, and tests are executed for functions contained in the test-target program. This thereby enables execution of tests of the test-target program with appropriate execution contents.

Second Exemplary Embodiment

Explanation next follows regarding a second exemplary embodiment. Although the testing device 10 is implemented by a computer 30 in the first exemplary embodiment, the second exemplary embodiment is an example of a case in which the testing device 10 is implemented by plural computers. The second exemplary embodiment is configured similarly to the first exemplary embodiment; the same reference numerals are therefore given to similar sections, and detailed explanation thereof is omitted.

Figure 15:
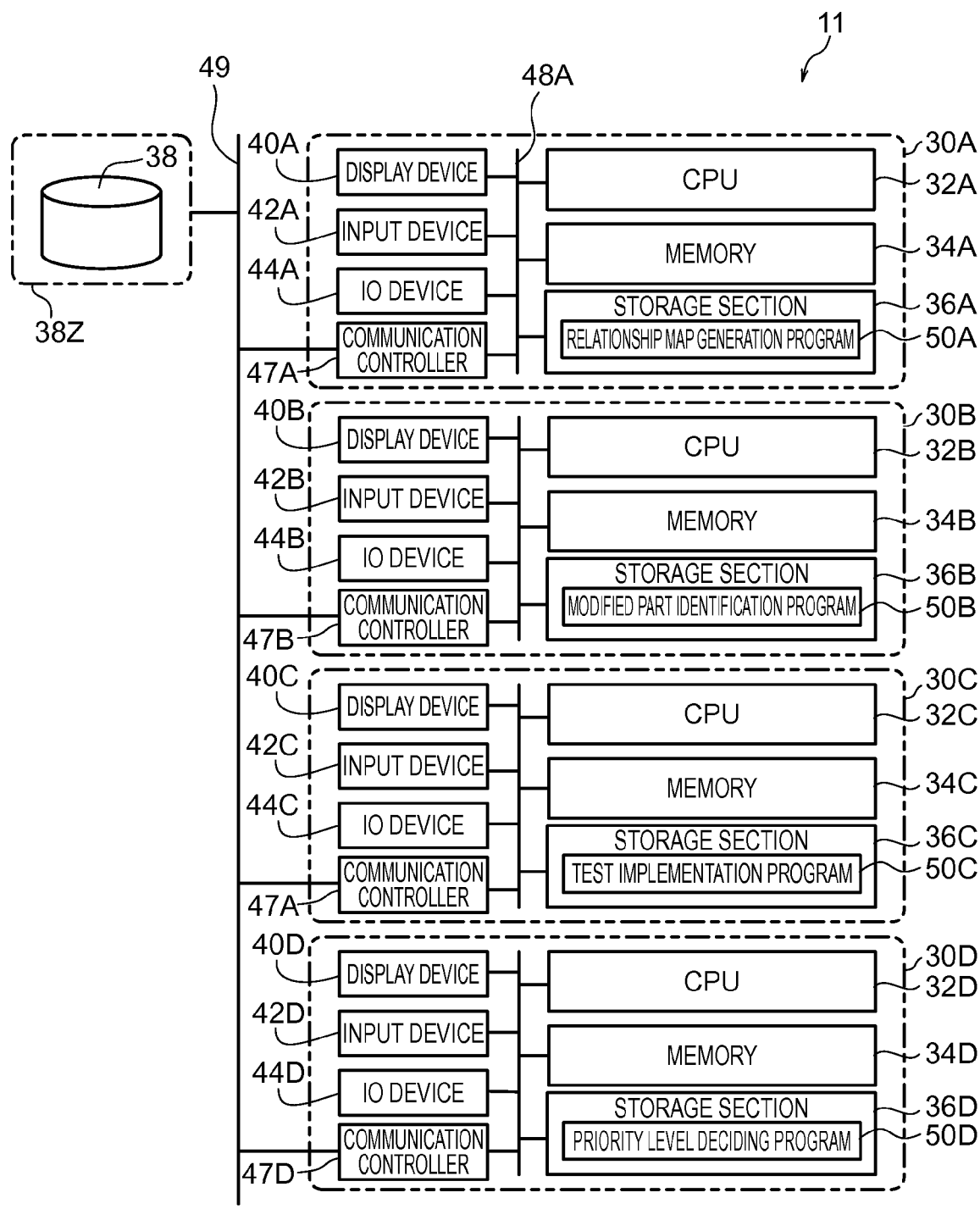
FIG. 15 is a block diagram illustrating an example of an implementation of the testing device by a computer system.

FIG. 15 illustrates an example of implementation of the testing device 10 by a computer system 11 containing plural computers 30A to 30D. Similarly to the computer 30, the plural computers 30A to 30D respectively include CPUs 32A to 32D, memory 34A to 34D, and storage sections 36A to 36D. The CPUs 32A to 32D, the memory 34A to 34D, and the storage sections 36A to 36D are each mutually connected through respective buses 48A to 48D. Each of the computers 30A to 30D are further provided with display devices 40A to 40D such as monitors, and input devices 42A to 42D, each connected to the buses 48A to 48D respectively. Moreover, in each of the computers 30A to 30D, IO devices 44A to 44D are connected to the buses 48A to 48D respectively. The computers 30A to 30D are provided with communication controllers 47A to 47D that are interfaces for connection to a computer network 49. Moreover, the computer network 49 is connected to an accumulator device 38Z provided with an accumulation section 38.

In the computer system 11 illustrated in FIG. 15, each process included in the testing program illustrated in FIG. 2 is stored and executed in each of the computers 30A to 30D. In the computer system 11 of the present exemplary embodiment, data and commands are transferred between each of the computers 30A to 30D through the communication controllers 47A to 47D and the computer network 49.

According to the above explanation, since it is possible to execute testing with the device that tests the test-target program distributed by individual functionality, in addition to the effects of the first exemplary embodiment, the second exemplary embodiment has an advantageous effect of enabling load distribution to be achieved for processing load when the test-target program is tested. Moreover, computers for each distributed functionality may be configured to be migratable, enabling an increase in degrees of freedom regarding locations for device installation.

Note that explanation has been given above of cases in which the testing device 10 is implemented by the computer system 30. However, there is no limitation to the above configuration, and obviously various improvements and modifications may be implemented within a range not departing from the spirit of technology disclosed herein.

Moreover, although explanation has been given above of cases in which the programs described are pre-stored (installed) in a storage section, there is no limitation thereto. For example, it is possible to provide the program of technology disclosed herein in a format recorded on a recording medium, such as a CD-ROM or a DVD.

An aspect of technology disclosed herein enables identification of individual implementation-target tests and identification of test contents, based on modified parts of a test-target program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a test program that causes a computer to execute a process comprising:

starting a test of a test-target program containing a plurality of modules by executing a plurality of individual tests, the plurality of individual tests being respectively associated with the plurality of modules;

generating test-relationships information that includes relationships between the plurality of individual tests based on module-relationships information including relationships of the plurality of modules; and specifying one or a plurality of additionally executing tests based on the test-relationships information when a test result indicates at least one of the plurality of individual tests has been abnormally completed, wherein the test-relationships information is updated based on a test result of an individual test among the plurality of individual tests, the test-relationships information is a probability of, or an accumulated number of, execution results indicating the individual tests respectively associated with the plurality of the modules which have been concurrently abnormally completed, and the test-relationships information is updated based on a test result of an individual test associated with a module executed for the test-target program and a test result of an individual test associated with another module associated with the module.

2. The non-transitory computer-readable recording medium having stored therein a test program according to claim 1, wherein the process further comprises:

storing, in a memory, the test-relationships information that includes relationships between the plurality of individual tests; and specifying the one or the plurality of additionally executing tests based on the test-relationships information that includes relationships between the plurality of individual tests stored in the memory.

3. The non-transitory computer-readable recording medium having stored therein a test program according to claim 1, wherein each of the modules includes at least one specific function.

4. The non-transitory computer-readable recording medium having stored therein a test program according to claim 1, wherein the test result includes data representing a case in which an error has arisen during execution of a specified individual test.

5. The non-transitory computer-readable recording medium having stored therein a test program according to claim 1, wherein the individual tests respectively associated with the plurality of modules contain a plurality of sub-tests; and the process further comprises generating, as test-relationships information that includes relationships between the plurality of individual tests respectively associated with the plurality of modules, test-relationships information that includes relationships between the sub-tests contained in the individual tests based on module-relationships information including relationships between the plurality of modules.

6. The non-transitory computer-readable recording medium having stored therein a test program according to claim 1, wherein the individual tests respectively associated with the plurality of modules contain a plurality of sub-tests; and the test process further comprises using test-relationships information that includes relationships between the plurality of individual tests as priority level data, and designating an execution sequence of the plurality of sub-tests contained in a specified individual test based on the priority level data.

7. The non-transitory computer-readable recording medium having stored therein a test program according to claim 1, wherein the process further comprises:

extracting a modified part of the test-target program; and executing, as a specified individual test, the individual test associated with a module corresponding to the extracted modified part.

8. The non-transitory computer-readable recording medium having stored therein a test program according to claim 1, wherein the test-target program contains a plurality of modules having dependency relationships representing an execution sequence; and the process further comprises executing the individual test(s) on the module(s) contained in the test-target program according to the dependency relationships representing the execution sequence.

9. A test method comprising:

by a processor, starting a test of a test-target program containing a plurality of modules by executing a plurality of individual tests, the plurality of individual tests being respectively associated with the plurality of modules;

by a processor, generating test-relationships information that includes relationships between the plurality of individual tests based on module-relationships information including relationships of the plurality of modules; and by a processor, specifying one or a plurality of additionally executing tests based on the test-relationships information when a test result indicates at least one of the plurality of individual tests has been abnormally completed, wherein the test-relationships information is updated based on a test result of an individual test among the plurality of individual tests, the test-relationships information is a probability of, or an accumulated number of, execution results indicating the individual tests respectively associated with the plurality of the modules which have been concurrently abnormally completed, and the test-relationships information is updated based on a test result of an individual test associated with a module executed for the test-target program and a test result of an individual test associated with another module associated with the module.

10. The test method according to claim 9, wherein:

the test result includes data representing a case in which an error has arisen during execution of a specified individual test.

11. The test method according to claim 9, further comprising:

updating the test-relationships information that includes relationships between the plurality of individual tests respectively associated with the plurality of modules based on test results of each of the individual tests executed on the test-target program.

12. The test method according to claim 9, wherein the individual tests respectively associated with the plurality of modules contain a plurality of sub-tests; and the test method further comprises
generating, as test-relationships information that includes relationships between the plurality of individual tests respectively associated with the plurality of modules, test-relationships information that includes relationships between the sub-tests contained in the individual tests based on module-relationships information including relationships between the plurality of modules.

13. The test method according to claim 9, wherein
the individual tests respectively associated with the plurality of modules contain a plurality of sub-tests; and
the test method further comprises
using test-relationships information that includes relationships between the plurality of individual tests as priority level data, and
designating an execution sequence of the plurality of sub-tests contained in a specified individual test based on the priority level data.

14. The test method according to claim 9, further comprising:
extracting a modified part of the test-target program; and
executing, as a specified individual test, the individual test associated with a module corresponding to the extracted modified part.

15. The test method according to claim 9, wherein
the test-target program contains a plurality of modules having dependency relationships representing an execution sequence; and
the test method further comprises executing the individual test(s) on the module(s) contained in the test-target program according to the dependency relationships representing the execution sequence.

16. A test device comprising:
a processor; and
a memory storing instructions, which when executed by the processor perform a procedure including:
starting a test of a test-target program containing a plurality of modules by executing a plurality of individual tests, the plurality of individual tests being respectively associated with the plurality of modules;
generating test-relationships information that includes relationships between the plurality of individual tests based on module-relationships information including relationships of the plurality of modules; and
specifying one or a plurality of additionally executed tests based on the test-relationships information when a test result indicates at least one of the plurality of individual tests has been abnormally completed,
wherein the test-relationships information is updated based on a test result of an individual test among the plurality of individual tests,
the test-relationships information is a probability of, or an accumulated number of, execution results indicating the individual tests respectively associated with the plurality of the modules which have been concurrently abnormally completed, and
the test-relationships information is updated based on a test result of an individual test associated with a module executed for the test-target program and a test result of an individual test associated with another module associated with the module.

17. The test device of claim 16, wherein the procedure further includes:
updating the test-relationships information that includes relationships between the plurality of individual tests respectively associated with the plurality of modules based on test results of each of the individual tests executed on the test-target program.

18. The test device of claim 16, wherein
the individual tests associated with the modules contain a plurality of sub-tests; and
the procedure further includes
generating, as test-relationships information that includes relationships between the plurality of individual tests respectively associated with the plurality of modules, test-relationships information that includes relationships between the sub-tests contained in the individual tests based on module-relationships information including relationships between the plurality of modules.

19. The test device of claim 16, wherein
the individual tests respectively associated with the respective plurality of modules contain a plurality of sub-tests; and
the procedure further includes
using test-relationships information that includes relationships between the plurality of individual tests as priority level data, and
designating an execution sequence of the plurality of sub-tests contained in a specified individual test based on the priority level data.

* * * * *